United States Patent [19]

Elmgren et al.

[11] Patent Number: 4,919,729

[45] Date of Patent: Apr. 24, 1990

[54] SOLDER PASTE FOR USE IN A REDUCING ATMOSPHERE

[75] Inventors: Peter J. Elmgren, Derry, N.H.; Alan J. Emerick, Warren Center, Pa.; Dennis L. Rivenburg, Sr., Endicott, N.Y.; Mukund K. Saraiya, Endwell, N.Y.; David W. Sissenstein, Jr., Endwell, N.Y.

[73] Assignee: International Business Machines Corporation, Armonk, N.Y.

[21] Appl. No.: 346,241

[22] Filed: May 2, 1989

Related U.S. Application Data

[63] Continuation of Ser. No. 203,965, Jun. 8, 1988, abandoned.

[51] Int. Cl.$^5$ .............................................. B23K 35/34
[52] U.S. Cl. ......................................... 148/24; 148/23
[58] Field of Search .................................... 148/23, 24

[56] References Cited

U.S. PATENT DOCUMENTS

| | | | |
|---|---|---|---|
| 2,169,659 | 8/1939 | Noble | 148/24 |
| 2,547,771 | 4/1951 | Pessel | 148/24 |
| 3,309,239 | 3/1967 | Harris | 148/24 |
| 3,396,454 | 8/1968 | Murdock | 29/494 |
| 3,414,964 | 12/1968 | Emeis | 29/473.1 |
| 3,436,278 | 4/1969 | Poliak | 148/23 |
| 3,478,414 | 11/1969 | Potter | 148/23 |
| 3,503,721 | 3/1970 | Lupfer | 29/195 |
| 3,665,590 | 5/1972 | Percival | 29/494 |
| 4,487,638 | 12/1984 | Hoge | 148/24 |
| 4,496,098 | 1/1985 | Kawakatsu | 228/219 |
| 4,538,757 | 9/1985 | Bertiger | 228/180.1 |
| 4,632,295 | 12/1986 | Brusic | 228/123 |

*Primary Examiner*—Peter D. Rosenberg
*Attorney, Agent, or Firm*—Blaney Harper; Jeffrey S. LaBaw; Maurice H. Klitzman

[57] ABSTRACT

A solder paste for use in a reducing atmosphere is disclosed. The solder paste includes a solder powder and an alcohol binder. The reducing atmosphere serves as a flux, thereby eliminating flux residues and the problems associated therewith. Solder splattering is reduced by using a polyhydric alcoholic binder which vaporizes or decomposes before the solder liquifies during heating. The use of such a solder paste in a reducing atmosphere results in no hazardous chemical by-products and, because the solder is handled in the form of a paste, is compatible with electrical components requiring precise dimensional tolerances.

18 Claims, 5 Drawing Sheets

THE ANTIMONY-TIN SYSTEM

WEIGHT PERCENTAGE TIN
THE ANTIMONY−LEAD−TIN−SYSTEM

FIG. 5

BOILING POINTS OF POLYHYDRIC ALCOHOLS

| CHEMICAL NAME | FORMULA | BOILING POINT |
|---|---|---|
| 1,2 ETHANEDIOL GLYCOL, DIHYDROXYETHANE, ETHYLENE GLYCOL | $HOC_2H_4OH$ | 197 C |
| 1,2 PROPANEDIOL PROPYLENE GLYCOL | $CH_2CH(OH)CH_2OH$ | 189 C |
| 1,3 PROPANEDIOL TRIMETHYLENE GLYCOL | $HOCH_2CH_2CH_2OH$ | 213 C |
| 1,2,3 PROPANETRIOL GLYCERIN, GLYCEROL | $HOCH_2CH(OH)CH_2OH$ | 290 C |
| 1,2 BUTANEDIOL α-BUTYLENEGLYCOL | $CH_3CH_2CH_2(OH)CH_2OH$ | 191 C |
| 1,3 BUTANEDIOL β-BUTYLENEGLYCOL | $CH_3CH(OH)CH_2CH_2OH$ | 208 C |
| 1,4 BUTANEDIOL TETRAMETHYLENEGLYCOL | $HOCH_2CH_2CH_2CH_2OH$ | 228 C |
| 2,3 BUTANEDIOL | $CH_3CH(OH)CH(OH)CH_3$ | 183 C |
| 1,2 PENTANEDIOL | $CH_3(CH_2)_2CH(OH)CH_2OH$ | 211 C |
| 1,4 PENTANEDIOL | $CH_3CH(OH)CH_2CH_2CH_2OH$ | 220 C |
| 1,5 PENTANEDIOL | $HO(CH_2)_5OH$ | 260 C |
| 2,3 PENTANEDIOL | $CH_3CH_2CH(OH)CH(OH)CH_3$ | 188 C |
| 1,6 HEXANEDIOL HEXAMETHYLENE GLYCOL | $HO(CH_2)_6OH$ | 250 C |
| 2,3 HEXANEDIOL | $CH_3(CH_2)_2CH(OH)CH(OH)CH_3$ | 205 C |
| 2,5 HEXANEDIOL | $CH_3CH(OH)(CH_2)_2CH(OH)CH_3$ | 217 C |

TABLE I

SOLDER PASTE FOR USE IN A REDUCING ATMOSPHERE

This is a continuation of Application Ser. No. 203,965, filed June 8, 1988, now abandoned.

BACKGROUND OF THE INVENTION

1. Field of the Invention

This invention relates to a solder paste suitable for use in a reducing atmosphere. More particularly, the solder paste includes a solder powder and a binder comprising alcohol.

2. Description of the Related Art

Solder is frequently used in the production of electronic components to join integrated circuit modules or chip carriers to circuit cards or circuit boards. For example, solder may be used to connect conductive metal pins from a module to the conductive circuit lines of a circuit card. It is known to apply solder to the components in the form of a solder preform or a solder paste. A solder preform is a solid composition of solder fabricated to the shape and dimensions required to contact the desired locations of each of the components to be joined. The preform is placed in proper position and subsequently heated to cause the solder to flow, or "reflow," and physically join the components. A solder paste is a composition of a solder powder in one or more liquid solvents or binders. The paste is screened on to the components, dried, and heated to reflow the solder and join the two components. For both preforms and pastes, a liquid flux is typically used to deoxidize the metal surfaces of the components to cause them to accept the solder.

The use of a conventional liquid flux results in flux residues left behind on the surface of the components after soldering. For example, a common flux such as waterwhite rosin leaves a metal salt residue abieate formed when the abietic acid in the rosin reacts with oxides on the metal surfaces of the components. Where the residue contacts the metal surfaces of the components, it will cause detrimental galvanic corrosion upon the passage of electrical current in normal use. Thus, the residue must be removed from the components after soldering and before electrical use.

Several problems are associated with the removal of flux residue. The first problem is the cost of solvents used to remove the residue, such as perchloroethylene or N-methyl pyrollidone, Methylene Chloride, Methylchloroform, or Freon. In addition, costly scrubber systems are required to reduce hazardous emissions of these solvents into the atmosphere. Finally, some hazardous emissions still occur despite the scrubbers, resulting in intangible harm to the environment.

One soldering process is known to eliminate flux residues. To prevent flux residue, the process replaced conventional liquid flux with a reducing atmosphere. By heating a solder preform in a reducing atmosphere such as hydrogen or carbon monoxide instead of an inert atmosphere such as nitrogen, oxides are removed from the metal surfaces of the components. The need for liquid flux is therefore eliminated. In addition, the "fluxless" process (i.e., no liquid flux is used) by-products are gases and certain hydrocarbons which can be readily removed by burning off with excess hydrogen to form carbon dioxide and water vapor.

Conventional soldering processes have not eliminated the problem of solder splattering during reflow. Splattered solder causes shorting between the individual conductive circuit lines of the components. In conventional processes, the liquid rosin flux breaks down when the solder is heated. The aforementioned reaction between metal oxide and abietic acid produces gases such as carbon dioxide and water vapor. These by-products outgas from the molten solder, causing such to splatter upon the components.

A final problem associated with that of soldering electronic components is that of precision. To assure that proper electrical connections, electrical components must often be joined according to tight dimensional tolerances. Solder preforms are inherently difficult to use in such applications because precision is limited by the accuracy by which the preform is placed upon the components. Hence, solder pastes are the preferred form for handling solder in such applications.

SUMMARY OF THE INVENTION

In view of the foregoing, it is the principal object of this invention to improve soldering compositions.

Yet another object of this invention is to improve fluxless soldering compositions.

Yet another object of this invention is a fluxless solder paste.

Still another object of this invention is a fluxless solder paste which will result in reduced solder splattering during solder reflow.

Still another object of this invention is a fluxless solder paste which will result in reduced solder splattering and no hazardous chemical by-products during reflow.

These and other objects of this invention are accomplished by a solder paste comprising a solder powder and an alcohol binder. The solder paste can be reflowed in a reducing atmosphere, which also serves as the flux. Such a flux leaves no residues, thereby eliminating problems associated therewith. Solder splattering is reduced by using a polyhydric alcoholic binder which vaporizes or decomposes before the solder liquifies during heating. Furthermore, the use of a fluxless solder paste in a reducing atmosphere results in no hazardouos chemical by-products and, because the solder is handled in the form of a paste, is compatible with electrical components requiring precise dimensional tolerances.

BRIEF DESCRIPTION OF THE DRAWING

FIG. 5 is a table of boiling points of polyhydric alcohols.

DESCRIPTION OF THE PREFERRED EMBODIMENT

Figure 1:
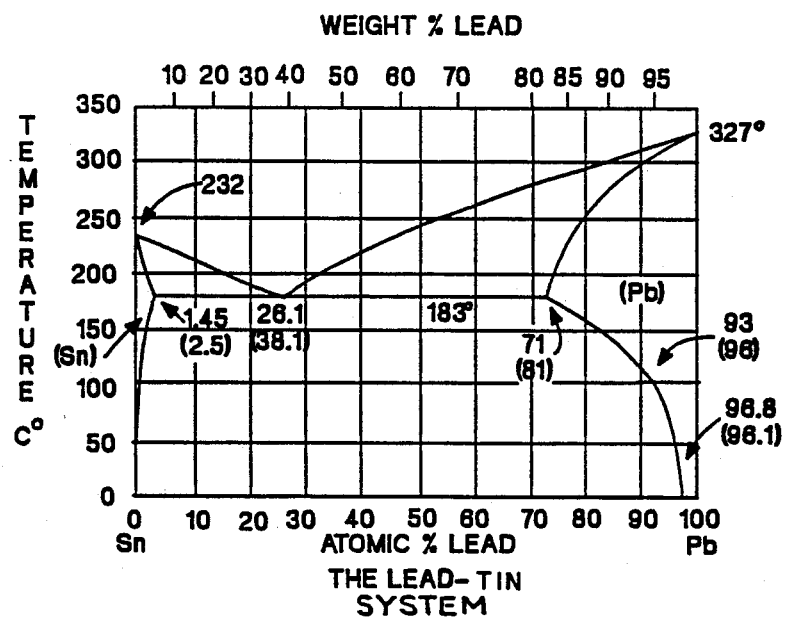
FIG. 1 is a phase diagram for the lead-tin system.

According to the invention, solder pasts including a solder powder and a binder comprising alcohol will now be described. Because the solder is in the form of a paste, as opposed to a solder preform, the tight dimensional tolerances sometimes required for the joining of electrical components are of minimal consequence. Furthermore, such a solder paste may be used in a reducing atmosphere, such as hydrogen or carbon monoxide. Liquid flux, and the disadvantages associated therewith (i.e., the costs and complications of removing flux residues), are eliminated because the reducing atmosphere acts as a flux. In addition, the only by-products from using the invention in a reducing atmosphere are gases and hydrocarbons which can be readily removed by burning off with excess hydrogen to form carbon dioxide and water vapor.

Many suitable materials exist for both the solder powder and the binder. Tin, bismuth, cadmium, antimony, indium, lead, silver, gold, or any similar materials are suitable for inclusion in a solder powder for electrical component applications. Solder powders are generally a mixture of at least two of these materials. Common tin-lead solder powder compositions, for example include 3% tin-97% lead, 5% tin-95% lead, 10% tin-90% lead, 37% tin-63% lead, 50% tin-50% lead. Polyhydric alcohols such as 1,2 ethanediol, 1,2 propanediol, 1,3 propanediol, 1,2,3 propanetriol, 1,3 butanediol, 1,4 butanediol, 1,5 pentanediol, 1,6 hexanediol, or 2,5 hexanediol are suitable binders. These alcohols have 2 to 3 hydroxyl groups, contain up to 20 carbon atoms, and have molecular weights of about 200–6000. Also, these alcohols exhibit viscosities of at least 50 centipoises, thereby creating enough surface tension when mixed with solder powder to temporarily hold the components to be joined together before reflowing.

The alcohol binder may be a combination of alcohols. For example, it would be possible to add an alcohol with a single hydroxyl group, such as benzyl alcohol, to an polyhydric alcohol with greater than 3 hydroxyl groups such as arabitol, erythritol, sorbitol, or xylitol, to lower the boiling point of the polyhydric alcohol to formulate a suitable binder for a particular application. In general, however, it is preferred to use a single alcohol with the desired boiling point annd viscosity. A partial list of polyhydric alcohols and their boiling points is found in FIG. 5. The actual boiling point of the alcohol is somewhat dependent on its purity which will vary from supplier to supplier.

The specific solder powder and binder comprising the solder paste should be chosen so as to further maximize the properties of the solder paste for an individual application. A two-step procedure can be used to choose a specific solder paste according to the invention. First, a solder powder should be chosen according to the material requirements of application. These requirements include the ability of the solder bond to exhibit a particular fatigue life, withstand certain future temperatures, and display the desired electrical characteristics.

Having chosen a solder power according to the specific application, a binder having a boiling temperature in the pasty region of the solder powder phase diagram should be chosen. This feature can best be described with reference to FIG. 1, assuming a solder powder composition of 37% tin-63% lead. According to the liquidus line of the phase diagram, the solder powder is completely liquid above a temperature of approximately 240 degrees C. According to the solidus line of the phase diagram, the solder powder is completely solid below a temperature of approximately 183 degrees C. The area between the liquidus and solidus lines of the phase diagram is known as the "pasty" region. Thus, according to the previously stated formula, a binder having a boiling or decomposition temperature between 183 and 240 degrees C should be chosen. Referring to FIG. 5, one such binder would be 1,3 propanetriol which has a boiling point of 213 degrees C.

The choice of a binder having a boiling temperature in the pasty region of the solder powder phase diagram achieves a reduction in solder spattering. If the boiling temperature of the binder is above the pasty region of the solder powder (i.e., above the liquidus line of the phase diagram), solder splatter will occur during solder reflow. Solder splatter occurs because the binder cannot outgas until after the solder has liquified. If the boiling point of the binder is below the pasty region of the solder powder (i.e., below the solidus line of the phase diagram), the binder will outgas prematurely and the solder will not hold together during solder reflow. Some materials do not boil, but simply decompose. Thus, the term "boiling temperature" as used herein also includes the temperature at which decomposition into gaseous materials occurs.

The use of a solder paste formulated according to the invention will now be described. After choosing the specific solder powder and binder to be used, the two are mixed to form a solder paste. The solder paste is then screened on to one or both of the components, which are properly positioned for joining. Screening is accomplished by use of any commercial screener, the use and operation of which is well known to one skilled in the art. The paste may be screened onto locations on a substrate, card, or board, contacting a wettable metal such as copper or tin, for example, Commponents, such as modules, capacitors, resistors, pins or edge clips, for example, may be inserted into the solder paste or the paste may be screened onto connection site after insertion of said components onto a substrate, card, or board. The procedure of which is well known in the field of conventional paste soldering. Finally, the assembly is ready for reflowing.

To reflow the solder paste, the components are placed in a furnace having a reducing atmosphere. Reflowing may be carried out in a furnace either batch-wide or continuously employing a conveyor belt. A suitable conveyor belt type of container exhibiting the desired reducing atmosphere is the platinum catalytic container disclosed in commonly assigned U.S. Pat. No. 4,568,277 to MacInnes, et al., the disclosure of which is incorporated herein by reference.

Reflowing for most tin-lead systems can be performed under the following conditions. A suitable reducing atmosphere is hydrogen containing less than 10 ppm of oxygen, and preferably less than 1 ppm of oxygen, and most preferably no oxygen. The reducing atmosphere should also contain less than 50 ppm of water, and preferably no water. The temperature of the hydrogen atmosphere should be approximately 300 to 500 degrees C, and preferably 350 to 450 degrees C. The flow rate of the gas in the furnace should be approximately 30 to 50 standard cubic feet per hour. The assembly should be exposed to the reducing atmosphere for approximately 5–15 minutes, and preferably for 5–10 minutes. In a conveyor type of furnace of about 216 inches in length, the conveyor speed should be approximately 5–20 inches per minute and preferably 11.5 inches per minute. Any further processing may be according to conventional techniques.

To aid in understanding the invention, the following illustrative examples are given:

EXAMPLE I

A solder powder consisting of 20% tin/80% lead was chosen. Referring to FIG. 1, the lead-tin phase diagram, a binder with a boiling point between 183 degrees C and 280 degrees C was suitable. 1,3 butanediol was chosen;

its boiling point of 208 degrees C was well within the pasty region of the solder system.

After mixing the solder paste, it was screened on a copper coated substrate. The substrate was placed in a furnace having a reducing atmosphere for reflow. Afer cooling, the substrate was examined for solder splattering. Little to no splattering was found.

EXAMPLE II

A solder powder consisting of 10% tin-90%/lead was chosen. Referring to FIG. 1, a binder with a boiling point between 275 degrees C and 300 degrees C was suitable. Glycerin (1,2,3 propanetriol) was chosen. After mixing, screening, and reflowing as above, little to no splattering was found.

EXAMPLE III

A solder powder consisting of 5% tin/95% lead was selected. Referring to FIG. 1, a binder with a boiling point between 305 degrees C and 312 degrees C would be suitable. However, 1,4 butanediol with a boiling point of 228 degrees C was chosen to test the theory of the invention. As expected, after mixing, screening, and reflowing, considerable splattering was found.

EXAMPLE IV

A solder powder of 5% tin/95% lead was selected. Glycerin was chosen as a binder. Although, the boiling point of glycerin (290 degrees C) was outside the pasty region of the solder composition (305-312 degrees C), it is closer than any of the other polyhydric alcohols in FIG. 5. After reflowing, this sample showed much less splattering than found in Example III, but somewhat more than in the first two examples where the boiling points of the alcohols were within the pasty region.

EXAMPLE V

Figure 2:
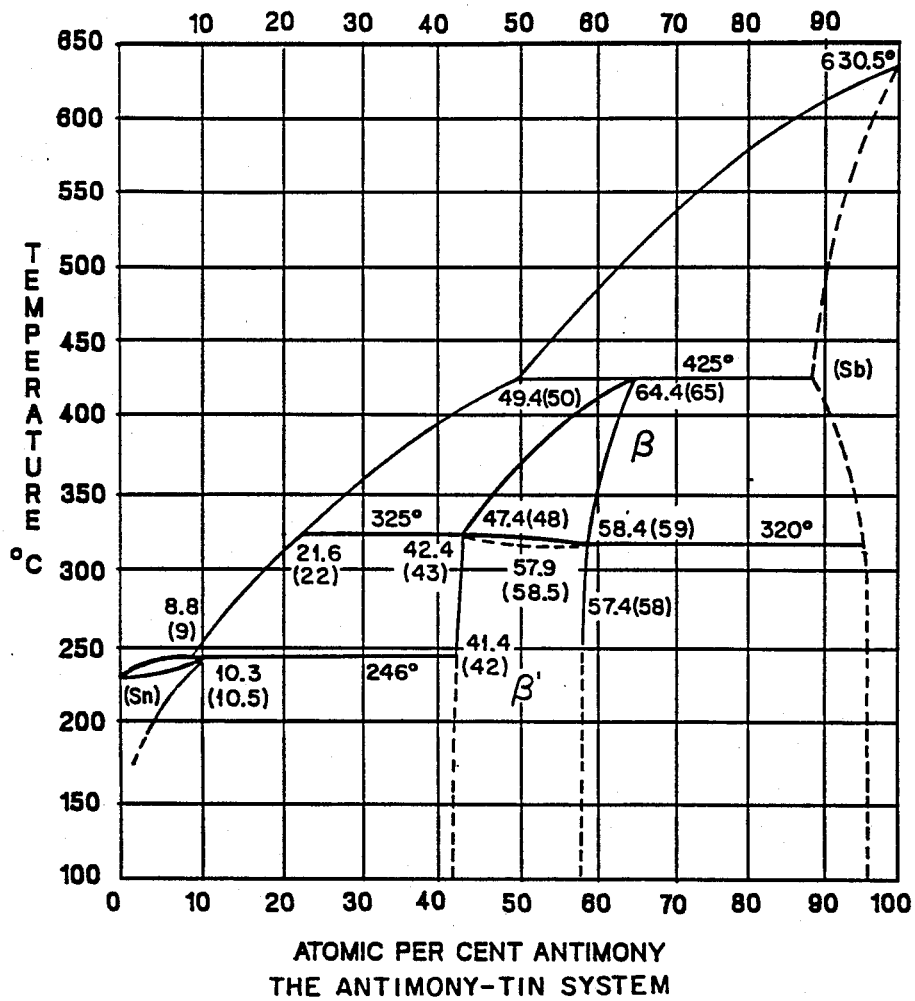
FIG. 2 is a phase diagram for the antimony-tin system.

A solder powder of 95% tin/5% antimony was chosen. Referring to FIG. 2, a binder with a boiling point between 233-240 degrees C was suitable. 1,5 pentanediol with a boiling point of 239 degrees C was selected.

EXAMPLE VI

Figure 3:
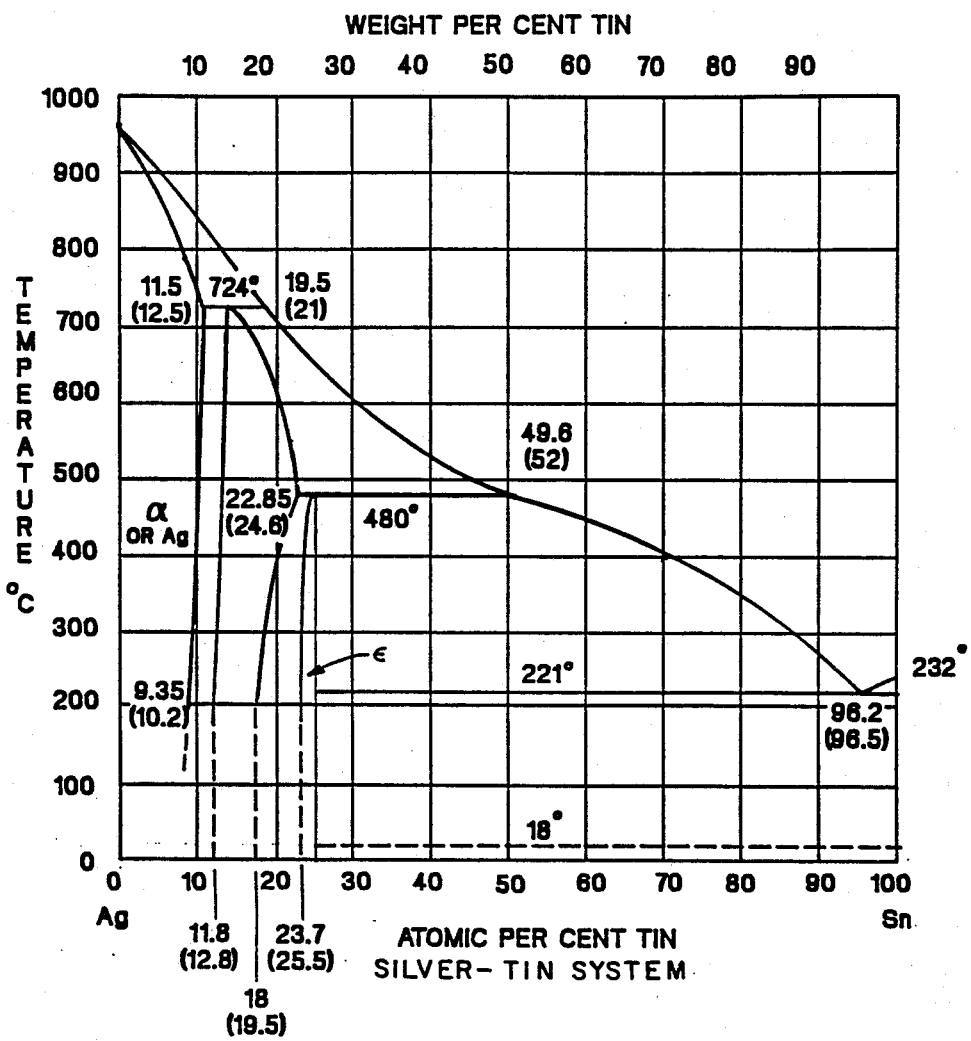
FIG. 3 is a phase diagram for the silver-tin system.

A solder powder of 95% tin/5% silver was selected. Referring to FIG. 3, a binder with a boiling point between 221-245 degrees C was suitable. 1,4 butanediol with a boiling point of 228 degrees C was chosen.

EXAMPLE VII

Figure 4:
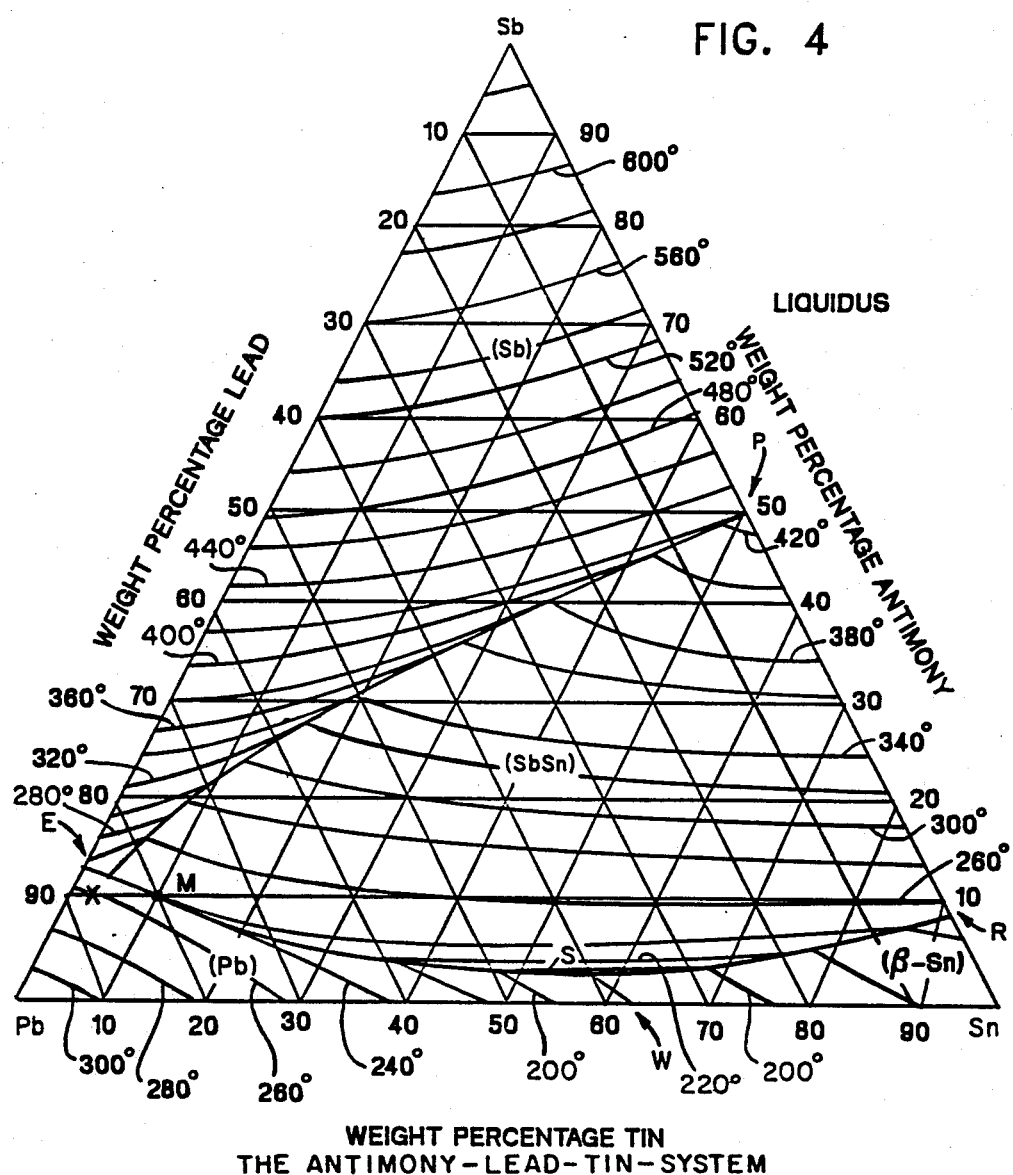
FIG. 4 is a phase diagram for the lead-tin-antimony system.

A solder powder of 50% tin/47% lead/3% antimony was chosen. Referring to FIG. 4, a binder with a boiling point between 185-204 degrees C was suitable. 1,2 butanediol with a boiling point of 174 degrees C was chosen.

While the invention has been described with respect to a preferred embodiment thereof, it will be understood by those skilled in the art that various changes in detail may be made therein without departing from the spirit, scope, and teaching of the invention. For example, the specific solder powder compositions are given herein for illustration only. Other compositions may also be used. Suitable phase diagram information may be found in *Constitution of Binary Alloys*, by Max Hanse, 1958, or in *Solders and Soldering*, by Howard H. Manko, 1979, 1964. Other polyhydric alcohols such as 1,3 pentanediol, 1,2,3 pentanetriol 3,4 hexanediol-3,4-diethyl, and 2,5 hexanediol-2,5-dimethyl may be used as binders. Accordingly, the invention herein disclosed is to be limited only as specified in the following claims.

We claim:

1. A fluxless solder paste heated in a reducing atmosphere for use in a soldering process comprising:
   a solder powder; a binder comprising at least one alcohol, and
   said binder having a boiling temperature within the pasty region of a phase diagram of said solder powder,
   said boiling temperature being determined by said alcohol, said boiling temperature of said binder reducing splattering associated with said soldering process.

2. The solder powder of claim 1 wherein said solder powder is a mixture of at least two metals.

3. The solder paste of claim 1 wherein said solder powder is a mixture of at least two metals selected from the group consisting of tin, bismuth, cadmium, antimony, indium, lead, silver, and gold.

4. The solder paste of claim 1 wherein said alcohol contains no more than 20 carbon atoms.

5. The solder paste of claim 1 wherein said alcohol contains approximately 1 to 3 hydroxyl groups.

6. The solder paste of claim 1 wherein said binder is an alcohol selected from the group comprising 1,2 propanediol, 1,3 propanediol, 1,2,3 propanetriol, 1,3 butanediol, 1,4 butanediol, 1,5 pentanediol, 1,6 hexanediol, and 1,5 hexanediol.

7. A method of making a fluxless solder paste for use in a soldering process comprising the steps of:
   selecting a solder powder which when reflowed will result in a solder bond with the desired electrical and mechanical characteristics,
   selecting a binder, comprising at least one alcohol, with a boiling point in the pasty region of the solder powder, phase diagram and
   mixing said solder powder and said binder to form the fluxless solder paste.

8. The solder paste of claim 1 wherein said alcohol raises said boiling temperature of said binder.

9. The solder paste of claim 1 wherein said alcohol lowers said boiling temperature of said binder.

10. A fluxless solder paste heated in a reducing atmosphere for use in a soldering process comprising:
    a solder powder,
    a binder comprising at least one alcohol,
    said binder having a boiling temperature lower than the pasty region of a phase diagram of said solder powder and within 10 percent of the lower bound of said pasty region when said solder powder contains at least 85 percent by weight lead,
    said boiling temperature being determined by said alcohol, and
    said boiling temperature of said binder reducing splattering associated with said soldering process.

11. The solder powder of claim 10 wherein said solder powder is a mixture of at least two metals.

12. The solder paste of claim 10 wherein said solder powder is a mixture of at least two metals selected from the group consisting of tin, bismuth, cadmium, antimony, indium, lead, silver, and gold.

13. The solder paste of claim 10 wherein said alcohol contains no more than 20 carbon atoms.

14. The solder paste of claim 10 wherein said alcohol contains approximately 1 to 3 hydroxyl groups.

15. The solder paste of claim 10 wherein said binder is an alcohol selected from the group comprising 1, 2 propanediol, 1,3 propanediol, 1,2,3 propanetriol, 1,3 butanediol, 1,4 butanediol, 1,5 pentanediol, 1,6 hexanediol, and 1,5 hexanediol.

16. The solder paste of claim 10 wherein said alcohol raises said boiling temperature of said binder.

17. The solder paste of claim 10 wherein said alcohol lowers said boiling temperature of said binder.

18. A method of making a fluxless solder paste for use in a reducing atmosphere comprising the steps of:

selecting a solder powder which when reflowed will result in a solder band with the desired electrical and mechanical characteristics, selecting a binder comprising at least one alcohol, with a boiling point lower than the pasty region of the solder powder and within 10 percent of the lower bound of said pasty region when said solder powder contains at least 85 percent by weight lead, and mixing said solder powder and said binder to form the fluxless solder paste.

* * * * *